United States Patent [19]
Alsup et al.

[11] Patent Number: 4,893,267
[45] Date of Patent: Jan. 9, 1990

[54] METHOD AND APPARATUS FOR A DATA PROCESSOR TO SUPPORT MULTI-MODE, MULTI-PRECISION INTEGER ARITHMETIC

[75] Inventors: Mitchell Alsup, Dripping Springs, Tex.; Yoav Talgam, Tel Aviv, Israel; Marvin A. Denman, Austin, Tex.

[73] Assignee: Motorola, Inc., Schaumburg, Ill.

[21] Appl. No.: 265,437

[22] Filed: Nov. 1, 1988

[51] Int. Cl.⁴ .............................................. G06F 7/38
[52] U.S. Cl. ..................................................... 364/745
[58] Field of Search ................................ 364/745, 748

[56] References Cited

U.S. PATENT DOCUMENTS

| | | | |
|---|---|---|---|
| 4,429,370 | 1/1984 | Blau et al. | 364/748 |
| 4,700,324 | 10/1987 | Doi et al. | 364/745 |
| 4,779,220 | 10/1988 | Nukiyama | 364/748 |
| 4,788,655 | 11/1988 | Nakayama et al. | 364/748 |

Primary Examiner—David L. Clark
Assistant Examiner—Tan V. Mai
Attorney, Agent, or Firm—Robert L. King

[57] ABSTRACT

In a data processor having an integer arithmetic unit, the carry-in control logic, carry-out control logic, and the overflow control logic of the arithmetic unit are adapted to be directly controlled by respective carry-in enable, carry-out enable, and overflow enable fields of the integer arithmetic instructions during the execution thereof.

3 Claims, 2 Drawing Sheets

METHOD AND APPARATUS FOR A DATA PROCESSOR TO SUPPORT MULTI-MODE, MULTI-PRECISION INTEGER ARITHMETIC

TECHNICAL FIELD

This invention relates generally to a data processor which supports integer arithmetic, and, in particular, to a data processor which supports multi-mode, multi-precision integer arithmetic.

BACKGROUND ART

In general, the largest representable "unit" of data i na data processor is fixed, thereby inherently limiting the size of operands that can be represented in a single data unit. However, in many data processing applications, it is necessary to perform integer arithmetic, such as addition and subtraction, on data operands which are larger than can be represented in the particular data unit available on the target processor. In order to satisfy this requirement, the arithmetic unit (AU) in the processor must be adapted to support multi-precision integer arithmetic by providing a mechanism for controlling the transfer between instructions of such information as carry-in/borrow-in and carry-out/borrow-out.

In most modern general purpose data processors, the AU supports multi-precision integer arithmetic by allowing arithmetic operations to be "chained". In some of these processors, the instruction set is sufficiently rich to allow the programmer to instruct the AU to provide a carry-out bit if an integer add should result in a carry, or to provide a borrow-out bit if an integer subtract should require a borrow. In such processors, the instruction set usually also allows the programmer to instruct the AU to accept a carry-in bit if a multi-precision integer add is desired, or to accept a borrow-in bit if a multi-precision integer subtract is desired.

In multi-precision processors, the carry control information is typically encoded into the "operation code" (op-code) portion of the integer arithmetic instructions. This technique, however, has two major disadvantages. First, it requires the dedication of a set of op-codes, leaving fewer op-codes for other functions. Second, it requires additional hardware and time to decode this essential control information. It would be advantageous, therefore, to provide a mechanism whereby this carry/borrow control information can be explicitly represented in non-encoded form in the integer instructions.

In addition to multi-precision integer arithmetic, many applications require both signed and unsigned integer arithmetic. In order to satisfy this multi-mode requirement, the arithmetic unit must be adapted, for example, to provide an overflow signal for signed arithmetic if an overflow condition is detected, but to ignore the overflow condition for unsigned arithmetic. In such processors, the instruction set includes allows the programmer to specify either signed or unsigned integer arithmetic. In addition, such processors typically allow the programmer to specify the response of the interrupt hardware to the overflow signal.

In conventional processors having an instruction set which do support multi-precision arithmetic but which lack explicit carry-in/carry-out control, the multi-precision "chain" of instructions is typically immediately preceded by an instruction which prepares the carry bit, typically to zero (0). In addition, in such processors, the chain of instructions must be contiguous since intervening instructions could affect the carry bit. These restrictions could be avoided if the carry control information could be explicitly specified in the instructions.

In multi-mode processors, the carry control information is typically encoded into the op-code portion of the integer arithmetic instructions. This technique, however, has the same disadvantages as in the multi-precision case. It would be advantageous, therefore, to provide a mechanism whereby this signed/unsigned control information can be explicitly represented in non-encoded form in the integer instructions.

SUMMARY OF THE INVENTION

Accordingly, a primary object of the present invention is to provide a mechanism whereby the carry/borrow control information can be explicitly represented in non-encoded form in the integer instructions.

Yet another object of the present invention is to provide a mechanism whereby this signed/unsigned control information can be explicitly represented in non-encoded form in the integer instructions.

These and other objects and advantages of the present invention are achieved in a data processor comprising: an instruction register for sequentially receiving and storing each of a plurality of instructions for execution by the data processor; an execution unit, including an arithmetic unit having addition/substraction carry logic and overflow logic, for selectively execution each of the instructions stored in the instruction register; and an instruction execution control unit for controlling the operation of the execution unit in the execution of each of the stored instructions. In accordance with the present invention, a selected one of the instructions includes: a carry-in enable field; a carry-out enable field; and an overflow enable field. In the preferred form, in response to the storage of the selected one of the instructions in the instruction register, the carry logic of the arithmetic unit is enabled to accept a carry-in bit in response to a first predetermined value in the carry-in control field and to selectively provide a carry-out bit in response to a second predetermined value in the carry-out control field, and the overflow logic of the arithmetic unit enabled to selectively provide an overflow signal in response to a third predetermined value in the overflow control field.

DESCRIPTION OF THE INVENTION

Figure 1:
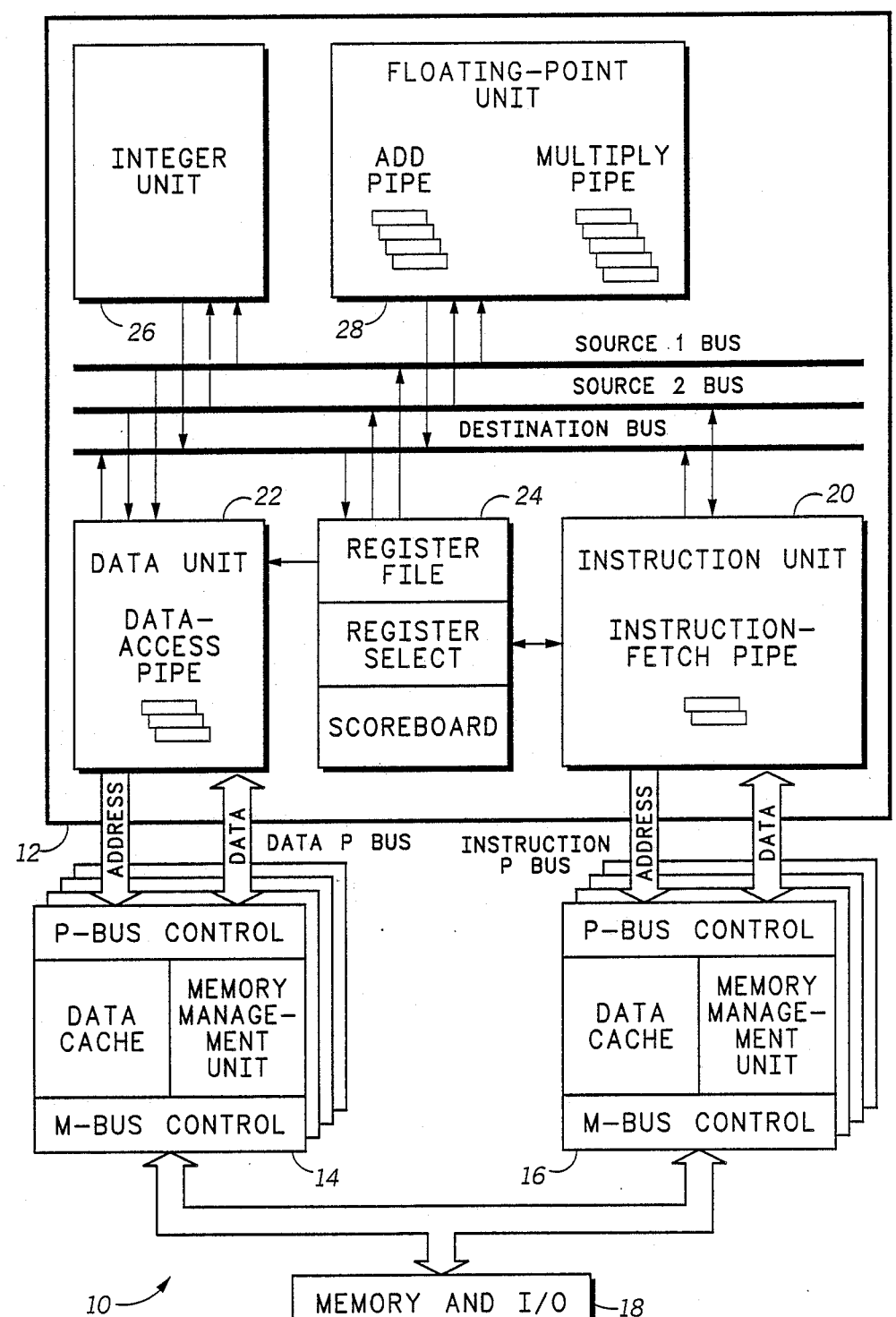
FIG. 1 illustrates in block diagram form a data processing system having a data processor adapted to practice the present invention.

Shown in FIG. 1 is a general block diagram of a data processing system 10 comprises of a Harvard-architecture style data processor (DP) 12, an instruction cache and memory management unit (ICMMU) 14, a data cache and memory management unit (DCMMU) 16, and a memory and input/out (I/O) subsystem 18. In general, the DP 12 comprises an instruction unit 20, a data unit 22, a register file 24, an integer unit 26, and a floating-point unit 28. Since the present invention relates to the data processor 12, and in particular to the integer unit 26, reference will be made to the other portions of the system 10 only when appropriate.

Figure 2:
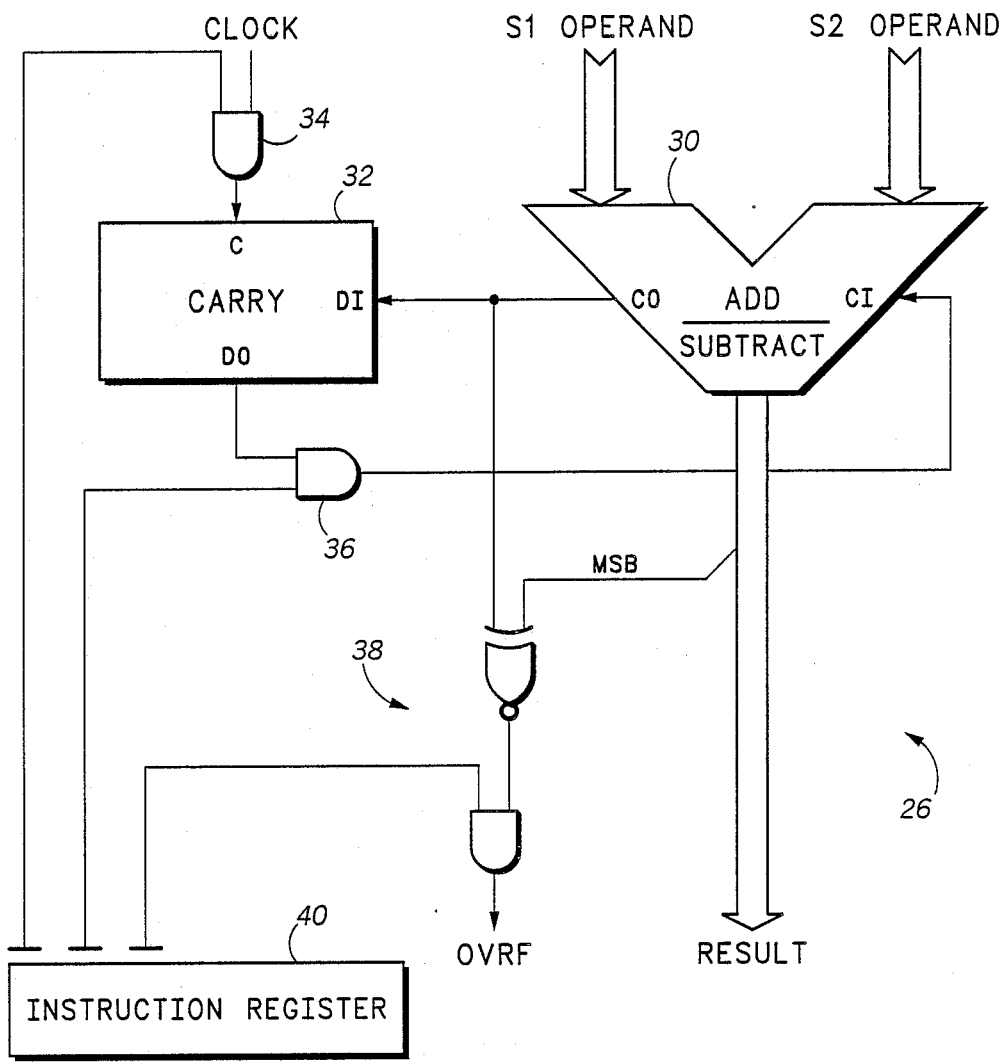
FIG. 2 illustrates in logic diagram form how the integer unit of the data processor of FIG. 1 is specially adapted to practice the present invention.

As shown in FIG. 2, integer unit 26 comprises an arithmetic unit (AU) 30, a carry latch 32 with associated carry-in control logic 34 and carry-out control logic 36, and overflow control logic 38. In accordance with the present invention, the integer addition and integer subtract instructions are defined to include, in addition to the ordinary op-code field, explicit control, or enable, fields for directly enabling the carry-in control logic 34, the carry-out control logic 36, and the overflow control logic 38 of the integer unit 26. In the preferred embodiment, therefore, the instruction unit 20 is constructed so that, for example, in response to loading an integer add instruction into an instruction register 40, the contents of a carry-in enable field of that instruction is coupled directly to the carry-in control logic 34, the contents of a carry-out enable field of that instruction is coupled directly to the carry-out control logic 36, and the contents of an overflow enable field of that instruction is coupled directly to the overlfow control logic 38. Thus, for example, if the carry-in enable field contains a logic one, then the carry-in control logic 36 will enable the arithmetic unit 30 to accept the carry bit from the carry latch 32. If, for example, the carry-out enable field contains a logic one, then the carry-out control logic 34 will enable the carry latch 32 to store the carry out of the arithmetic unit 30. Similarly, if the overflow enable field contains a logic one, then the overflow control logic 38 will be enabled to assert the overflow signal if the carry out of the arithmetic unit 30 is different from the most-significant-bit (MSB) of the result. Of course, any one or more of these enable fields may be set in any particular integer instruction as appropriate. Thus, by proper setting of the carry-in enable field, the carry-out enable field, and the overflow enable field, the programmer can exercise direct control over the arithmetic unit 30 to easily and efficiently accomplish multi-mode, multi-precision integer arithmetic.

We claim:

1. In a data processor comprising:
   an instruction register for sequentially receiving and storing each of a plurality of instructions for execution by the data processor;
   an execution unit, including an arithmetic unit having addition/subtraction carry logic and overflow logic, for selectively executing each of said instructions stored in the instruction register; and
   an instruction execution control unit for controlling the operation of the execution unit in the execution of each of said stored instructions;
   the improvements wherein a selected one of said instructions includes;
   a carry-in enable field;
   a carry-out enable field;
   an overflow enable field;
   and wherein, in response to the storage of said selected one of said instructions in the instruction register, the carry logic of the arithmetic unit is enabled to accept a carry-in bit in response to a first predetermined value in said carry-in enable field and to selectively provide a carry-out bit in response to a second predetermined value in said carry-out enable field, and the overflow logic of the arithmetic unit is enabled to selectively provide an overflow signal indicating an overflow of bits in the arithmetic unit in response to a third predetermined value in said overflow control field.

2. A data processor comprising:
   an instruction register for sequentially receiving and storing each of a plurality of instructions for execution by the data processor;
   an execution unit, including an arithmetic unit having addition/subtraction carry logic and overflow logic, for selectively executing each of said instructions stored in the instruction register; and
   an instruction execution control unit for controlling operation of the execution unit in the execution of each of said instructions;
   wherein a selected one of said instructions includes:
   a carry-in enable field;
   a carry-out enable field; and
   an overflow enable field;
   and wherein in response to the storage of said selected one of said instructions in the instruction register, the carry logic of the arithmetic unit is enabled to accept a carry-in bit in response to a first predetermined value in said carry-in enable field and to selectively provide a carry-out bit in response to a second predetermined value in said carry-out enable field, and the overflow logic of the arithmetic unit is enabled to selectively provide an overflow signal indicating an overflow of bits in the arithmetic unit in response to a third predetermined value in said overflow enable field.

3. A method of controlling logic circuitry in data processor, said data processor comprising:
   an instruction register for sequentially receiving and storing each of a plurality of instructions for execution by the data processor;
   an execution unit, including an arithmetic unit having addition/subtraction carry logic and overflow logic, for selectively executing each of said instructions stored in the instruction register; and
   an instruction execution control unit for controlling the operation of the execution unit in the execution of each of stored instructions;
   wherein a selected one of said instructions includes;
   a carry-in enable field;
   a carry-out enable field; and
   an overflow enable field;
   the method, practiced by the data processor in response to the storage of said selected one of said instructions in the instruction register, comprising the steps of:
   enabling the carry logic of the arithmetic unit to accept a carry-in bit in response to a first predetermined value in said carry-in enable field and to selectively provide a carry-out bit in response to a second predetermined value in said carry-out enable field; and
   enabling the overflow logic of the arithmetic unit to selectively provide an overflow signal indicating an overflow of bits in the arithmetic unit in response to a third predetermined value in said overflow enable field.

* * * * *